(12) United States Patent
Newman, Jr. et al.

(10) Patent No.: US 6,646,843 B1
(45) Date of Patent: Nov. 11, 2003

(54) SHORT CIRCUITED SEMICONDUCTOR SWITCH DETECTION

(75) Inventors: Robert C. Newman, Jr., Emmaus, PA (US); Timothy P. Hulick, Schwenksville, PA (US); Stephen R. Irving, Emmaus, PA (US); Scott Jurell, Mertztown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 09/972,641

(22) Filed: Oct. 6, 2001

Related U.S. Application Data (60) Provisional application No. 60/303,509, filed on Jul. 6, 2001.

(51) Int. Cl.[7] ................................................. H02H 7/00
(52) U.S. Cl. ........................................................ 361/65
(58) Field of Search ............................. 361/93.1–7, 65; 307/57–115, 126; 340/644, 660; 329/500, 522

(56) References Cited

U.S. PATENT DOCUMENTS 5,962,934 A * 10/1999 Fendt et al. ................. 307/126

* cited by examiner

*Primary Examiner*—Gregory J. Toatley, Jr.
*Assistant Examiner*—Boris Benenson
(74) *Attorney, Agent, or Firm*—Mark E. Rose (57) ABSTRACT

A method and apparatus are provided for detecting a short circuited semiconductor switch. The apparatus comprises a semiconductor switching device and a short circuited switch detection device. The semiconductor switching device comprises an input, an output, and a control input for switching the semiconductor switching device. The short circuited switch detection device comprises an input and an output. The input of the short circuited switch detection device is coupled to the semiconductor switching device, wherein the short circuited switch detection device detects a short circuit in the semiconductor switch switching device.

20 Claims, 4 Drawing Sheets

SHORT CIRCUITED SEMICONDUCTOR SWITCH DETECTION

CROSS-REFERENCE TO RELATED APPLICATIONS

This application claims the benefit of U.S. Provisional Application No. 60/303,509, filed Jul. 6, 2001.

FIELD OF THE INVENTION

The invention relates to electrical power switching of a load, and more particularly, to determining whether a semiconductor switching device is short circuited in a closed state, and further, to take appropriate action to prevent damage to certain types of loads.

BACKGROUND OF THE INVENTION

There are many applications where it is desirable to control the amount of average electrical power to a load. One example of such an application is a lamp dimmer. A lamp dimmer typically functions by switching on the ac line voltage to a load (i.e., the lamp) at a point in the half cycle of the ac line voltage between voltage zero crossings, rather than at the beginning of a half cycle. That is, the lamp only receives voltage (is on) for a portion of an ac line voltage half cycle. The greater the portion of the half cycle that the voltage applied to the lamp is on versus off, the greater the light output. As the portion of the half cycle that voltage is applied to the lamp is reduced, the light output is reduced. The lamp load can be a conventional line voltage incandescent lamp, or it can be a low voltage incandescent lamp which is connected to the controlled line voltage waveform through a magnetic transformer.

Conventional lamp dimming circuits may use two (or more) semiconductor switches to control the voltage, and hence, the current and average electrical power to the lamp. One semiconductor switch is for the first, positive half cycle of an ac voltage waveform and the other semiconductor switch is for the second, negative half cycle of the ac voltage waveform. If one of the semiconductor switches fails in the closed state (i.e., the switch short circuits closed), which is the most common failure mode, the light dimming circuit may provide non-symmetrical current to the load. For example, if a dimmer is set to provide 50 percent of full line voltage, and the first semiconductor switch fails closed, the first switch will conduct for 100 percent of its half cycle, and the second switch will conduct for 50 percent of its half cycle. That is, the first switch conducts for the full positive half cycle of the ac line voltage waveform, and the second switch conducts for 50 percent of the negative half cycle of the ac line voltage waveform. As can be appreciated, this type of failure allows more positive current than negative current to flow to the load, thereby creating a non-symmetrical current having a dc component. The dc component may be harmful to some loads. For example, in a magnetic transformer, the dc component of current is dissipated as heat, which may eventually cause transformer failure and/or other damage. The worst case failure typically occurs when the lamp dimmer is adjusted to a minimum and the still normally functioning semiconductor switch provides almost no voltage in its half cycle, and the other semiconductor switch is short circuited. In this case, a load is exposed to half wave rectified pulsating dc voltage.

Therefore, there is a need for a system and method for determining if a semiconductor switch is short circuited in the closed state.

SUMMARY OF THE INVENTION

The invention is directed to determining if a semiconductor switching device is short circuited in the closed state.

According to an aspect of the invention, an apparatus is provided for detecting a short circuited semiconductor switch. The apparatus comprises a semiconductor switching device and a short circuited switch detection device. The semiconductor switching device comprises an input, an output, and a control input for switching the semiconductor switching device. The short circuited switch detection device comprises an input and an output. The input of the short circuited switch detection device is coupled to the semiconductor switching device, wherein the short circuited switch detection device detects a short circuit in the semiconductor switch switching device.

According to an aspect of the invention, the semiconductor switching device comprises a first and a second semiconductor power switch in series connection to a common point and a control input that switches each semiconductor power switch. Each semiconductor power switch may comprise a field effect transistor, a metal oxide semiconductor field effect transistor, an insulated gate bipolar transistor with a reverse parallel power diode connected from collector to emitter of each transistor, and the like.

According to a further aspect of the invention, the short circuited switch detection device comprises a first inverter comprising an input and an output, a first resistor, and a first rectifier series coupled to the first resistor. The first inverter is coupled to a drain of the first semiconductor power switch via the series coupled first rectifier and first resistor. The short circuited switch detection device further comprises a second inverter comprising an input and an output, a second resistor, and a second rectifier series coupled to the second resistor. The second inverter is coupled to a drain of the second semiconductor power switch via the series coupled second rectifier and second resistor.

According to another aspect of the invention, the short circuited switch detection device further comprises a third resistor, a first capacitor, and a first zener diode in parallel connection between the input of the first inverter and the common point, and a fourth resistor, a second capacitor, and a second zener diode in parallel connection between the input of the second inverter and the common point.

According to a further aspect of the invention, the apparatus further comprises a full power device that comprises an input and an output. The input of the full power device is coupled to the output of the short circuited power switch detection device, and the output of the full power device is coupled to the control input of the still normally functioning semiconductor power switching device, wherein the full power device enables full power to pass through the semiconductor switching device, responsive to the output of the short circuited power switch detection device.

According to yet another aspect of the invention, a method is provided for protecting a load from a short circuited semiconductor switch in a semiconductor switching device comprising a first and second semiconductor power switch. The method comprises detecting the short circuited power switch, and switching the non-short circuited power switch to full power.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the several views of the drawings, and wherein.

DETAILED DESCRIPTION OF ILLUSTRATIVE EMBODIMENTS

The invention is directed to determining if a semiconductor switching device is short circuited in the closed state.

Figure 1:
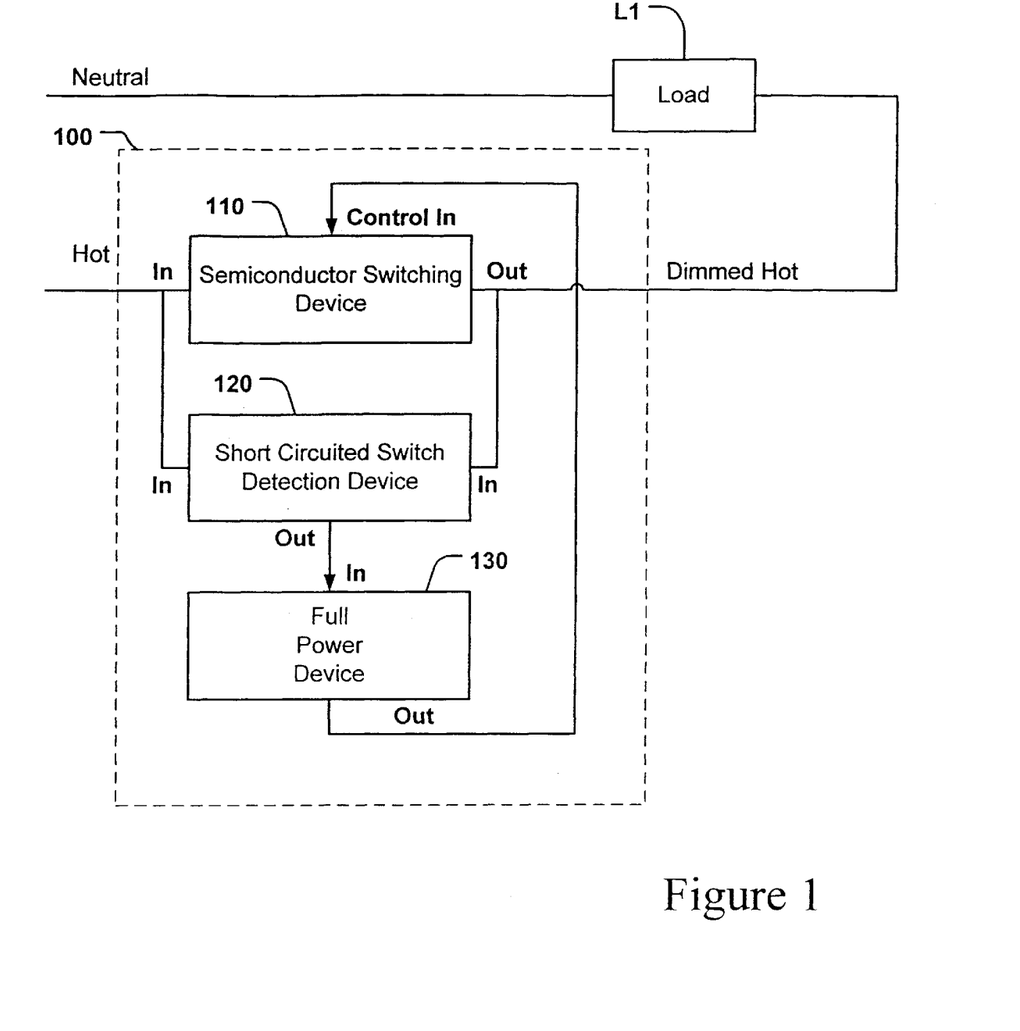
FIG. 1 is a block diagram of an illustrative circuit for determining if a semiconductor switch is short circuited in the closed state, in accordance with an embodiment of the invention.

FIG. 1 is a block diagram of an illustrative circuit for detecting a short circuited semiconductor switch. As shown in FIG. 1, apparatus 100 includes semiconductor switching device 110, short circuited switch detection device 120, and full power device 130. Apparatus 100 is for connection between an electric ac line (e.g., hot line) and a load L1. A typical ac line comprises a 120 volt, 60 Hz, single phase power source, and a typical load L1 comprises a lighting load. The ac line may also comprise a 220 to 240 volt, 50 or 60 Hz, single phase power source, and the like. The lighting load L1 may comprise a line voltage incandescent lamp or a low voltage incandescent lamp connected to a magnetic transformer.

Semiconductor switching device 110 comprises a hot input, a dimmed hot output, and a control input for switching the switching device. Current is conducted from the hot input to the dimmed hot output during a first half cycle of an ac line voltage waveform based on the state of the control input. When the control input is on, current is conducted from the hot input to the dimmed hot output and when the control input is off, current is not conducted from the hot input to the dimmed hot output. Current is also conducted from the dimmed hot output to the hot input during the second half of the ac cycle, in response to the state of the control input, in a manner similar to the operation during the first or positive half cycle. The hot input may be any ac line voltage input.

Figure 2:
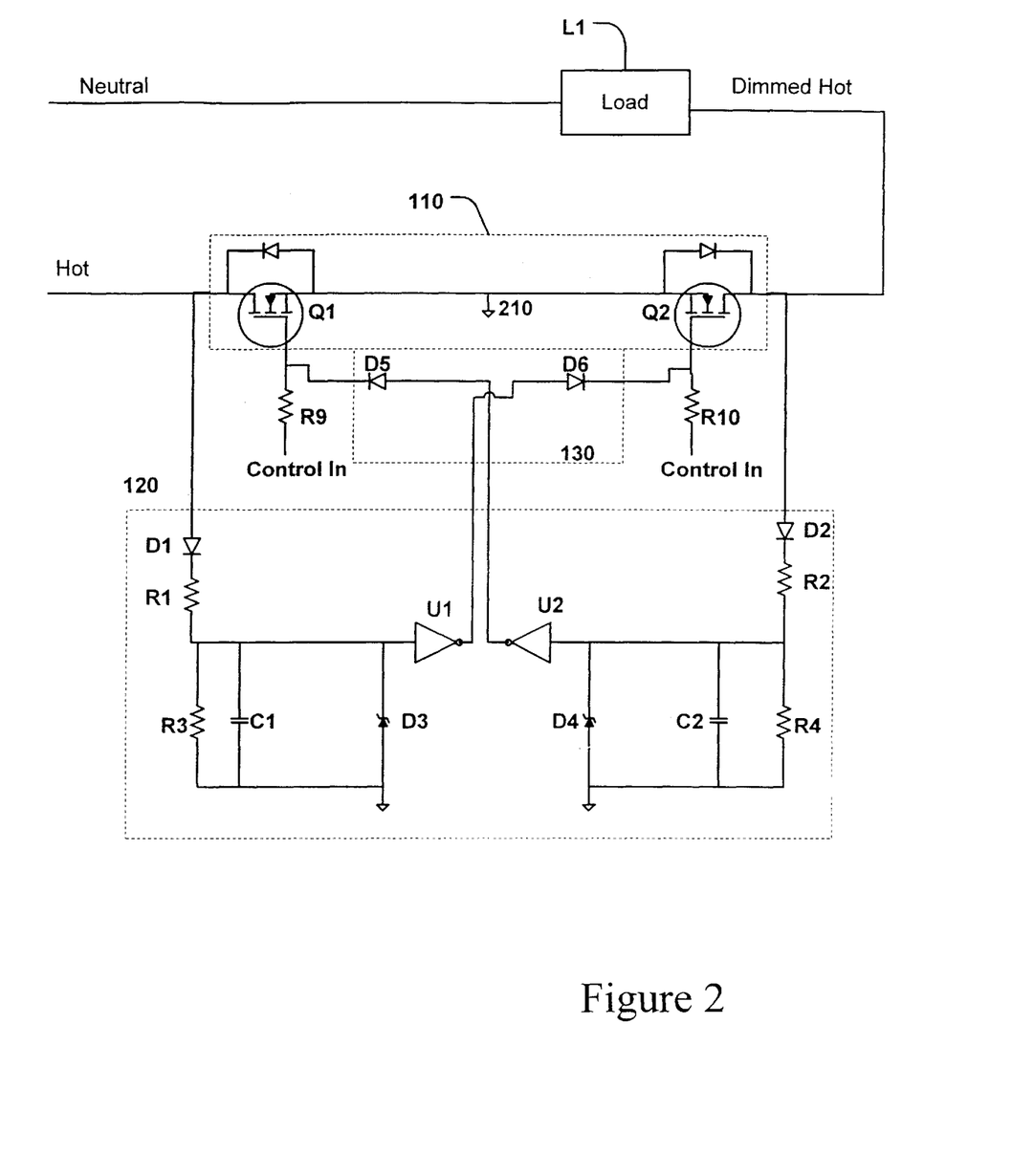
FIG. 2 is a circuit schematic diagram of a portion of the illustrative circuit of FIG. 1, in accordance with an embodiment of the invention.

To illustrate further details, FIG. 2 is a circuit schematic diagram of a portion of the illustrative circuit of FIG. 1. As shown in FIG. 2, semiconductor switching device 110 comprises two semiconductor power switches. In this embodiment, semiconductor switching device 110 comprises two power field effect transistors (FETs), Q1 and Q2, wired in series connection so that they share a common source connection to circuit common 210. Circuit common 210 is not the same as earth ground and is isolated from earth ground. In the present embodiment, FETs Q1 and Q2 are HEXFETs® commercially available from International Rectifier, El Segundo, Calif.; however, FETs Q1 and Q2 may be any appropriate power FETs suitable for the ac line voltage and highest expected load current. In another embodiment, semiconductor switching device 110 comprises insulated gate bipolar transistors (IGBT) wired in inverse series connection, with a reverse polarity diode parallel coupled across the collector and emitter connections of each IGBT. Preferably, Q1 and Q2 are connected in inverse series relationship wherein the sources of Q1 and Q2, or the emitters of Q1 and Q2, as appropriate, share the point of common connection.

Each FET Q1, Q2 is also shown with a diode connected across the FET, specifically, with the diode cathode connected to the FET drain terminal and the diode anode connected to the FET source terminal. This body-drain diode, as it is known, is an integral part of the FET and is a by-product of the FET manufacturing process.

The drain of FET Q1 is connected to the hot side of the power source. The drain of FET Q2 is connected to the dimmed hot side of load L1. The neutral side of the ac line is connected to the other side of load L1. In this manner, changing the duration of conduction of the control inputs of FETs Q1, Q2 determines the RMS voltage applied to, and hence, the average power to, load L1.

FET Q1 conducts for a portion of the first half cycle of the ac line voltage waveform, allowing current to pass through load L1 in the positive direction. FET Q2 conducts for a portion of the second half cycle of the ac line voltage waveform, allowing current to pass through load L1 in the negative direction. Typically, the amount and duration of current in the positive direction is substantially the same as the amount and duration of current in the negative direction for a given ac line voltage waveform cycle. If however, one of the FETs Q1, Q2 becomes short circuited in the closed state, the short circuited FET becomes conductive for an entire half cycle, while the other, still normally operating FET may conduct current for only a fraction of a half cycle, for example, if power is commanded to be reduced by dimming circuitry (not shown).

Referring back to FIG. 1, short circuited switch detection device 120 comprises a first input, a second input, and an output and detects a short circuited semiconductor power switch. The first input of short circuited switch detection device 120 is coupled to the input of the semiconductor switching device 110 and the second input of short circuited switch detection device 120 is coupled to the output of the semiconductor switching device 110. The output of short circuited switch detection device 120 is coupled to the input of full power device 130. In one embodiment, short circuited switch detection device 120 detects a short circuited semiconductor switch by sensing a voltage across the drain and source terminals of the semiconductor switch, as described in more detail below.

Full power device 130 comprises an input and an output and commands the non-short circuited power switch to conduct current for the full duration of a half cycle. The input of full power device 130 is coupled to the output of short circuited switch detection device 120. The output of full power device 130 is coupled to the control input of semiconductor switching device 110 for commanding the non-short circuited power switch to conduct current for the full duration of a half cycle, as described in more detail below.

As shown in FIG. 2, short circuited switch detection device 120 comprises an inverter U1, U2 for each semiconductor power switch Q1, Q2, respectively. Each inverter U1, U2 comprises an input and an output and outputs an output logic state responsive to a voltage at the input of the inverter. In particular, inverter U1 outputs a logic high in response to a voltage below a voltage threshold and outputs a logic low in response to a voltage above the voltage threshold.

The input of inverter U1 is coupled to the drain of semiconductor power switch Q1 via a series connected resistor R1 and rectifier D1. The input of inverter U1 is also coupled to circuit ground 210 via a parallel connected zener diode D3, capacitor C1, and resistor R3. The input of inverter U2 is coupled to the drain of semiconductor power switch Q2 via a series connected resistor R2 and rectifier D2. The input of inverter U2 is also coupled to circuit common 210 via a parallel connected zener diode D4, capacitor C2, and resistor R4.

To explain the operation of short circuited switch detection device 120, a semiconductor power switch Q1, Q2 conducting for less than a complete half cycle (i.e., less than 180° of conduction angle), has a positive drain to source voltage during the off time of the half cycle. The positive voltage causes a current to flow through either rectifier D1 or D2. If the current flows through rectifier D1, the current also flows through resistor R1 to the parallel combination of resistor R3, capacitor C1, and zener diode D3. If the current flows through rectifier D2, the current also flows through resistor R2 to the parallel combination of resistor R4, capacitor C2, and zener diode D4. The current creates a voltage at the input of inverter U1 or U2. The zener diodes D3, D4 clamp the voltage to the zener voltage and the capacitors C1, C2 hold the voltage charge when the ac line voltage swings lower than the zener voltage. Resistors R3, R4 have a high resistance so that capacitors C1, C2 do not appreciably discharge during this time. The voltage drops of zener diodes D3, D4 are chosen to be high enough to be considered a logic high state for inverters U1, U2. For example, if Vcc (the power supply voltage to the inverters) is 15 volts, then the zener voltage may be between about 10 volts and about 15 volts.

If, however, either semiconductor power switch Q1 or Q2 becomes short circuited from drain to source, there is essentially no voltage drop from drain to source and the corresponding capacitor C1 or C2 eventually discharges through resistor R3 or resistor R4, respectively, causing the input to inverter U1 or U2 to fall to the logic low state. The output of the inverter corresponding to the short circuited power switch outputs a logic high state, setting the gate of the non-short circuited power switch to a logic high state, thereby commanding it to conduct current for the entire half cycle. At this point, both semiconductor power switches Q1, Q2 are conducting current for an entire half cycle, one power switch due to the fact that it is short circuited, and the other power switch because it is commanded on by its respective inverter U1, U2. In this manner, there is substantially no dc component applied to load L1 when a power switch fails in the closed state. In the presently preferred embodiment resistors R3 and R4 are selected so that the voltage across semiconductor power switch Q1 or Q2 must fall below the value of the zener voltage for a period of five or six line cycles before the short circuited switch detection device is actuated and the output of inverter U1 or U2 outputs a logic high state. This ensures that there is no false tripping due to power outages or transients, but it is not long enough to overheat a magnetic transformer.

Driving a semiconductor power switch Q1, Q2 into full conduction causes the short circuited switch detection device to command the other semiconductor power switch into fall conduction. Hence, once a short circuit of one of the semiconductor power switches Q1, Q2 is detected, both semiconductor power switches are commanded to conduct current for their entire respective half cycles.

The normal operating range of the lamp dimmer in the preferred embodiment of the invention is selected such that at maximum light output there is still a 1 millisecond off time of the semiconductor power switches during each line half cycle. This ensures that there is a voltage from drain to source for semiconductor power switches Q1, Q2 for a portion of the half cycle which is high enough (approximately 20V) to be clamped by zener diodes D3, D4 and charge capacitors C1, C2 to ensure a logic high state at the input of inverters U1, U2. Preferably, the zener voltage of zener diodes D3 and D4 is selected to be less than half this voltage; i.e., 10V.

Full power device 130 comprises rectifiers D5, D6. Rectifiers D5, D6 are coupled between the gates of semiconductor power switches Q1, Q2 and the outputs of inverters U2, U1, respectively. A high logic state at the inputs of rectifiers D5, D6 causes the gate of semiconductor power switch Q1, Q2 respectively to go high, thereby turning on the semiconductor power switch and conducting full current through the switch. The semiconductor power switch conducts full current regardless of other instructions from other gate drive circuits (not shown) because these instructions are buffered by resistors R9 and R10. A low logic state at the inputs of rectifiers D5, D6, does not turn on the semiconductor power switches Q1, Q2 and rectifiers D5, D6 allow commands from other circuits (not shown) to control the gates of semiconductor power switches Q1, Q2.

In one embodiment, resistors R1, R2 are about 470KΩ, resistors R3, R4 are about 10 MΩ, and capacitors C1, C2 are about 0.01 uF for a discharge time constant of about 100 milliseconds, or about six line cycles at 60 Hz or five line cycles at 50 Hz.

Figure 3:
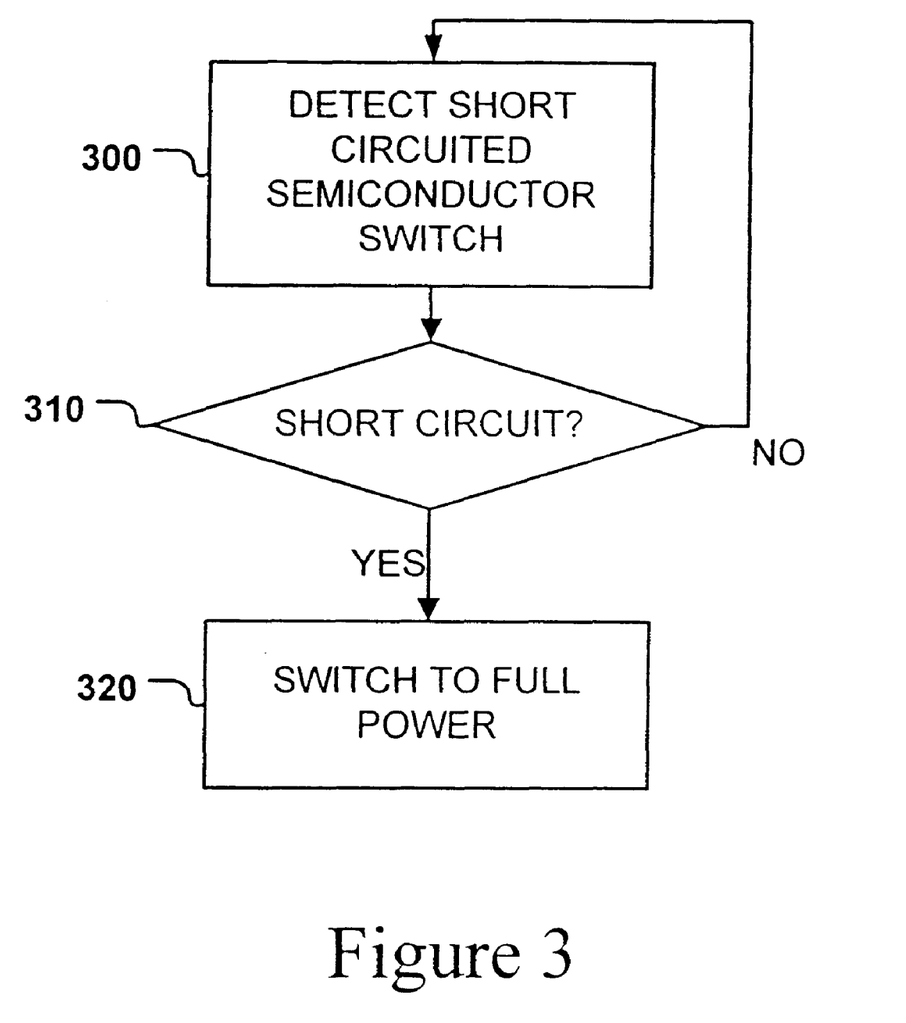
FIG. 3 is a flow diagram of an illustrative method for determining if a semiconductor switch is short circuited in the closed state and illustrating the operation of the illustrative circuit of FIG. 1, in accordance with an embodiment of the invention.

FIG. 3 is a flow diagram of an illustrative method for determining if a semiconductor switch is short circuited in the closed state and illustrating the operation of the illustrative circuit of FIG. 1. As shown in FIG. 3, at step 300, short circuited switch detection device 120 (FIG. 1) detects a short circuited semiconductor switch. As described above, short circuited switch detection device 120 may detect a short circuited switch by sensing a voltage across the drain and source terminals of the switch.

At step 310, short circuited switch detection device 120 responds based on whether a short circuited switch was detected at step 300. If a short circuit was not detected, the method proceeds back to step 300. If a short circuit was detected, the method proceeds to step 320.

At step 320, short circuited switch detection device 120 commands full power device 130 (FIG. 1) to switch the non-short circuited power switch to conduct current for the full duration of a half cycle. Short circuited switch detection device 120 may command full power device 130 by outputting a high logic state to the gate of the non-short circuited FETs Q1 or Q2 through rectifiers D5 or D6, as described above.

Figure 4:
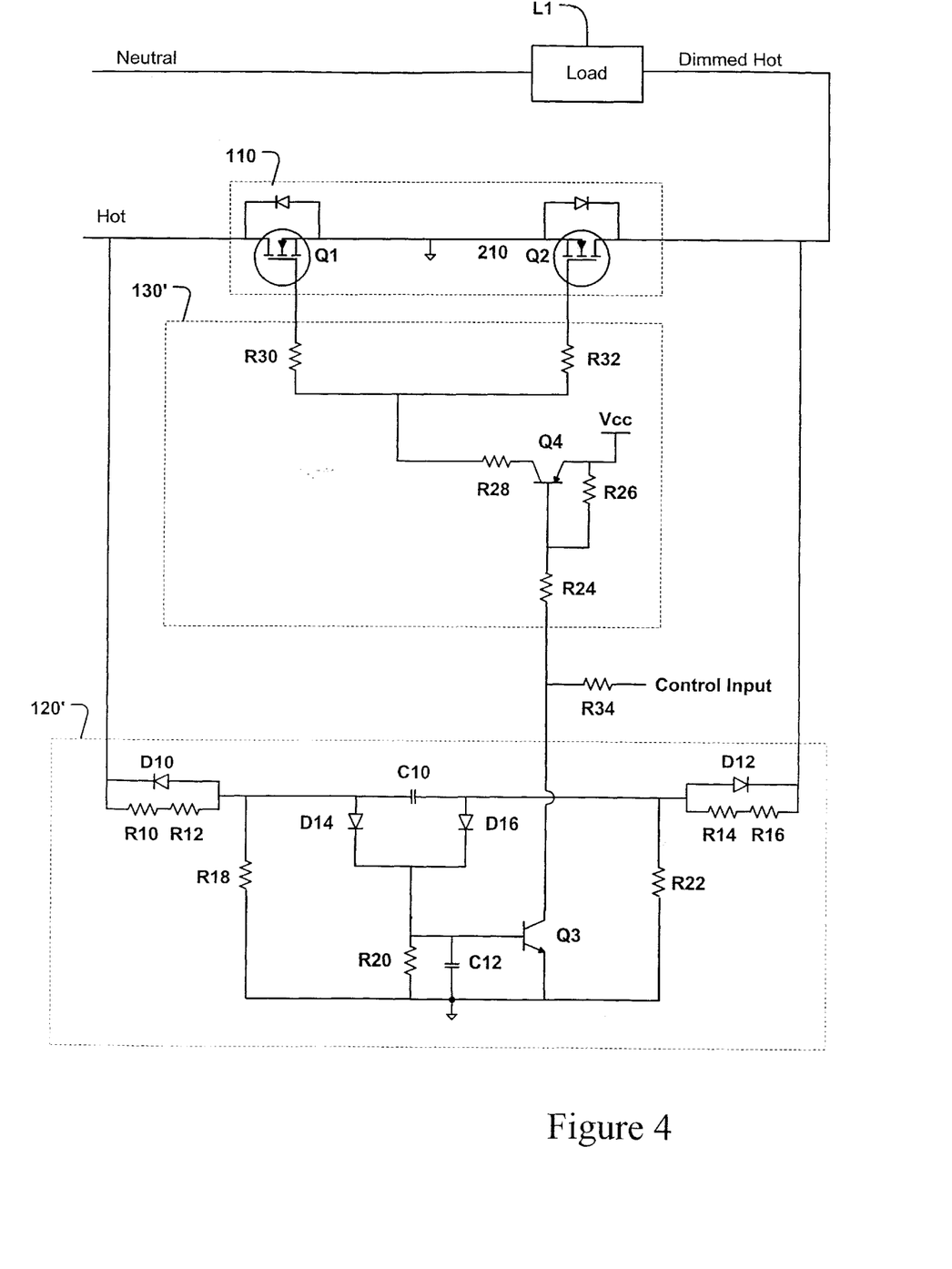
FIG. 4 is a circuit schematic diagram of a portion of the illustrative circuit of FIG. 1, in accordance with an alternative embodiment of the invention.

FIG. 4 is a circuit schematic diagram of an alternative embodiment of the illustrative circuit of FIG. 1. As shown in FIG. 4, semiconductor switching device 110 comprises the semiconductor power switches Q1, Q2. The operation of semiconductor switching device 110 is the same as that described with respect to the operation of semiconductor switching device 110 of FIG. 2. Referring back to FIG. 4, short circuited switch detection device 120' comprises a first input, a second input, and an output and detects a short circuited semiconductor power switch. The first input of short circuited switch detection device 120' is coupled to the input of semiconductor switching device 110, and the second input of short circuited switch detection device 120' is coupled to the output of the semiconductor switching device 110. The output of short circuited switch detection device 120' is coupled to the input of full power device 130'. In the embodiment illustrated in FIG. 4, short circuited switch detection device 120' detects a short circuited semiconductor switch by sensing a dc voltage across semiconductor switching device 110, as described in detail below.

Full power device 130' comprises an input and an output, and commands all semiconductor power switches Q1, Q2 into full conduction. In an alternative embodiment, full power device 130' could command only the non-short circuited semiconductor switch to conduct current for the full duration of a half cycle. The input of full power device 130' is coupled to the output of short circuited switch detection device 120'. The output of full power device 130' is coupled to the control input of semiconductor switching device 110 for commanding all power switches into full conduction.

As shown in FIG. 4, short circuited switch detection device 120' comprises diodes D10, D12 and resistors R10/R12 and resistors R14/R16. Resistors R10/R12 are in parallel with diode D10 and resistors R14/R16 are in parallel with diode D12. Short circuited switch detection device 120' further comprises capacitor C10, diodes D14 and D16 and resistors R18 and R22. The resistor values of R10/R12 and R14/R16 are chosen to give a large RC time constant between these charging resistors and capacitor C10 which minimizes false detection. The resistors R18 and R22 provide reference to the circuit common, and function as bleeder resistors to dissipate the inherent asymmetry caused by resistor tolerancing.

Short circuited switch detection device 120' further comprises resistor R20, capacitor C12 and transistor Q3. The short circuited switch detection device 120' functions by charging the capacitor C10 whenever a semiconductor power switch Q1, Q2 is not conducting. In the positive half cycle the charging path is through resistors R10, R12, capacitor C10 and diode D12. In the negative half cycle the charging path is through resistors R16, R14, capacitor C10 and diode D10. As mentioned earlier, resistors R18 and R22 act as bleeder resistors to remove the imbalance due to tolerancing of the large resistors R10/R12 and R14/R16.

If semiconductor power switches Q1 and Q2 are conducting symmetrically, i.e., the volt-seconds during the conduction time in the positive and the negative half cycles are the same, the voltage across capacitor C10 will be a sinusoid with a resulting peak voltage no greater than about 0.4V. However, if one of the semiconductor power switches Q1, Q2 becomes short circuited from drain to source then the voltage across semiconductor switching device 110 becomes non-symmetrical with a dc component. In this condition the voltage across capacitor C10 begins to increase each cycle. Once this voltage exceeds two diode forward bias voltage drops, transistor Q3 is turned on. Resistor R20 serves to set a minimum current required to bias transistor Q3, and capacitor C12 is used to absorb noise and prevent false tripping. Transistor Q3 turning on is a signal that a non-symmetrical voltage exists across semiconductor switching device 110 which may be due to a shorted semiconductor power switch Q1, Q2.

Full power device 130' comprises resistors R24 and R26 and transistor Q4. Resistor 24 provides a limiting impedance for transistor Q3. Resistor R26 serves to set a threshold current on transistor Q4 by forming a voltage divider with resistor R24. Full power device 130' further comprises resistors R28, R30, and R32. Resistors R30 and R32 serve to isolate the gates of semiconductor power switches Q1, Q2. Resistor R28 provides a limiting impedance for transistor Q4.

A control input for controlling the semiconductor power switches Q1, Q2 during normal operation is connected through isolation resistor R34 to the junction of the transistor Q4 and the resistor R24.

The full power device 130' functions as follows: when transistor Q3 in short circuited switch detection device 120' turns on it acts to turn on transistor Q4. This in turn provides current to the gates of semiconductor power switches Q1, Q2 turning them both full on and thus removing the non-symmetrical component of the voltage across semiconductor switching device 110 and the load L1.

The action of driving both switching devices into full conduction would appear to drive the dc component of voltage to zero, thereby removing the input signal to the shorted switch detection circuit. This would lead one to expect an oscillation between full conduction and partial conduction of the semiconductor power switches, thereby defeating the intended purpose of the short circuit detection apparatus. However, the system of the semiconductor switching device 110, the short circuited switch detection device 120', and the full power device 130', in combination, unexpectedly acts in a closed loop fashion so as to reduce the long term average dc voltage across the semiconductor switching device 110 to a substantially low value, for example, three to four volts. This voltage is low enough to prevent significant heating in magnetically coupled loads. The time constant established by the resistors R10, R12, R14, R16, R18, R22, and the capacitor C10, is sufficiently long, with respect to the operating line frequency (50/60 Hz), to prevent the control system of 110, 120', and 130' from oscillating between the expected conditions mentioned above.

In one embodiment, resistors R10, R12, R14, and R16 have a value of 1.5 M$\Omega$, capacitor C10 has a value of 1 uF, resistor R20 has a value of 470 k$\Omega$, capacitor C12 has a value of 2200 pF, resistors R18 and R22 have a value of 56 k$\Omega$, resistor R24 has a value of 33 k$\Omega$, resistor R26 has a value of 10 k$\Omega$, and resistors R30 and R32 have a value of 100 $\Omega$.

The invention may be embodied in the form of appropriate computer software, or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

It is to be understood that the foregoing illustrative embodiments have been provided merely for the purpose of explanation and are in no way to be construed as limiting of the invention. Words which have been used herein are words of description and illustration, rather than words of limitation. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. An apparatus for detecting a short circuited semiconductor switch, the apparatus comprising:

a semiconductor switching device comprising an input, an output, and a control input for switching the semiconductor switching device, said semiconductor switching device further comprising a first and a second semiconductor power switch in inverse series connection, and wherein each of said first and second semiconductor power switches comprises a control input that switches each respective semiconductor power switch; and a short circuited switch detection device comprising an input and an output, the input of the short circuited switch detection device coupled to the semiconductor switching device, wherein the short circuited switch detection device detects a short circuit in one of said first and second semiconductor power switches in the semiconductor switching device.

2. The apparatus as recited in claim 1, wherein each semiconductor power switch comprises a field effect transistor.

3. The apparatus as recited in claim 1, wherein each semiconductor power switch comprises a metal oxide semiconductor field effect transistor.

4. The apparatus as recited in claim 1, wherein each semiconductor power switch comprises an insulated gate bipolar transistor and a reverse parallel power diode connected from collector to emitter of each transistor.

5. The apparatus as recited in claim 1, wherein
each semiconductor power switch comprises a field effect transistor, the source of each semiconductor power switch being connected to a common point; and
the short circuited switch detection device comprises:
 a first inverter comprising an input and an output, a first resistor; and
 a first rectifier series coupled to the first resistor, the first inverter coupled to the drain of the first semiconductor power switch via the series coupled first rectifier and first resistor; and
 a second inverter comprising an input and an output, a second resistor; and
 a second rectifier series coupled to the second resistor, the second inverter coupled to the drain of the second semiconductor power switch via the series coupled second rectifier and second resistor.

6. The apparatus as recited in claim 5, wherein
the short circuited switch detection device further comprises:
 a third resistor, a first capacitor, and a first zener diode in parallel connection between the input of the first inverter and the common point; and
 a fourth resistor, a second capacitor, and a second zener diode in parallel connection between the input of the second inverter and the common point.

7. The apparatus as recited in claim 1, further comprising: a full power device comprising an input and an output, the input of the full power device coupled to the output of the short circuited switch detection device, the output of the full power device coupled to the control input of the semiconductor switching device, wherein the full power device commands the semiconductor switching device to conduct full power responsive to the output of the short circuited switch detection device.

8. The apparatus as recited in claim 7, wherein the full power device comprises:
 a first rectifier coupled between an output of the short circuited switch detection device and said control input of said first semiconductor power switching device; and
 a second rectifier coupled between an output of the short circuited switch detection device and said control input of said second semiconductor power switching device.

9. The apparatus recited in claim 1 wherein the short circuited switch detection device further comprises a voltage detection device which detects a short circuit in one of said first and second semiconductor power switches by detecting that a voltage across one of said first and second semiconductor power switches has fallen below a predetermined value.

10. The apparatus recited in claim 9 further comprising a full power device comprising an input and an output, the input of the full power device coupled to the output of the short circuited switch detection device, the output of the full power device coupled to said control inputs of each of said first and second semiconductor power switches wherein said full power device commands at least one of said first and second semiconductor power switches to become conductive for 100% of its respective half cycle of an input ac waveform when said short circuited switch detection device detects a short circuit in one of said first and second semiconductor power switches.

11. An apparatus for detecting a short circuited semiconductor switch, the apparatus comprising:
 a semiconductor switching device comprising an input, an output and a control input for switching the semiconductor switching device, said semiconductor switching device further comprising a first and a second semiconductor power switch in inverse series connection and wherein each of said first and second semiconductor power switches comprises a control input that switches each respective semiconductor power switch; and
 a short circuited switch detection device comprising an input and an output, the input of the short circuited switch detection device coupled to the semiconductor switching device, said short circuited switch detection device further comprising a dc voltage detection device which detects a short circuit in one of said first and second semiconductor power switches by detecting that the dc voltage across said semiconductor switching device has risen above a predetermined level.

12. The apparatus of claim 11 further comprising a full power device comprising an input and an output, said input of said full power device coupled to said output of said short circuited switch detection device, said output of said full power device coupled to said control inputs of each of said first and second semiconductor power switches, wherein said full power device commands at least one of said first and second semiconductor power switches to be conductive for 100% of its respective half cycle of an input ac waveform when said short circuited switch detection device detects a short circuit in one of said first and second semiconductor power switches.

13. A method for protecting a load from a short circuited semiconductor switch in a semiconductor switching device comprising a first and a second semiconductor power switch, the method comprising:
 detecting a short circuited power switch; and
 switching a non-short circuited power switch to full conduction.

14. The method as recited in claim 13, wherein detecting comprises: sensing a voltage from a drain to a source of one of the first and second semiconductor power switches.

15. The method as recited in claim 13, wherein switching comprises:
 switching the second semiconductor power switch to full conduction, if the sensed voltage from the first semiconductor power switch is below a threshold voltage; and switching the first semiconductor power switch to full conduction, if the sensed voltage from the second semiconductor power switch is below a threshold voltage.

16. The method as recited in claim 13, wherein switching comprises:

switching the second semiconductor power switch to full conduction, if the sensed voltage from the first semiconductor power switch is below a zener diode voltage; and switching the first semiconductor power switch to full conduction, if the sensed voltage from the second semiconductor power switch is below a zener diode voltage.

17. The method as recited in claim 13, wherein switching the non-short circuited power switch to full conduction comprises:

outputting a logic high to the second semiconductor power switch, if the sensed voltage from the first semiconductor power switch is below a threshold voltage; and outputting a logic high to the first semiconductor power switch, if the sensed voltage from the second semiconductor power switch is below a threshold voltage.

18. The method as recited in claim 13, wherein switching the non-short circuited power switch to full conduction comprises:

outputting a logic high to the second semiconductor power switch, if the sensed voltage from the first semiconductor power switch is below a zener diode voltage; and outputting a logic high to the first semiconductor power switch, if the sensed voltage from the second semiconductor power switch is below a zener diode voltage.

19. The method as recited in claim 13 wherein detecting comprises:

sensing a dc voltage across said first and second semiconductor power switches.

20. The method as recited in claim 19 wherein switching comprises:

switching said first and second semiconductor power switches to full conduction.

* * * * *